US 8,160,593 B2

(12) United States Patent
Buckley

(10) Patent No.: US 8,160,593 B2
(45) Date of Patent: *Apr. 17, 2012

(54) APPARATUS, AND ASSOCIATED METHOD, FOR TRANSPOSING SHORT CODES USED TO DIRECT A CALL TO A SERVICE CENTER DURING OPERATION OF A MOBILE COMMUNICATION SYSTEM

(75) Inventor: Adrian Buckley, Tracy, CA (US)

(73) Assignee: Research In Motion Limited, Waterloo (CA)

( * ) Notice: Subject to any disclaimer, the term of this patent is extended or adjusted under 35 U.S.C. 154(b) by 948 days.

This patent is subject to a terminal disclaimer.

(21) Appl. No.: 12/115,233

(22) Filed: May 5, 2008

(65) Prior Publication Data
US 2008/0207208 A1    Aug. 28, 2008

Related U.S. Application Data

(63) Continuation of application No. 10/773,468, filed on Feb. 5, 2004, now Pat. No. 7,383,041.

(30) Foreign Application Priority Data

Feb. 6, 2003 (WO) ................ PCT/CA03/00162

(51) Int. Cl.
*H04W 4/00* (2009.01)
(52) U.S. Cl. ............. 455/445; 455/428; 455/456.1; 455/466; 455/560; 455/564
(58) Field of Classification Search ............ 455/445, 455/428, 456.1, 466, 564, 566
See application file for complete search history.

(56) References Cited

U.S. PATENT DOCUMENTS

| 6,134,319 | A | 10/2000 | Burg et al. |
| 6,345,095 | B1 | 2/2002 | Yamartino |
| 6,356,767 | B2 | 3/2002 | Froula |
| 6,522,882 | B1 | 2/2003 | Chen et al. |
| 6,567,664 | B1 | 5/2003 | Bergenwall et al. |
| 6,956,930 | B1 | 10/2005 | Cook |
| 6,996,076 | B1 | 2/2006 | Forbes et al. |
| 2002/0086671 | A1 | 7/2002 | Amin et al. |
| 2002/0136368 | A1 | 9/2002 | Aoki et al. |
| 2002/0160766 | A1 | 10/2002 | Portman et al. |
| 2002/0186832 | A1* | 12/2002 | Mani ............... 379/355.01 |
| 2003/0109271 | A1 | 6/2003 | Lewis et al. |
| 2004/0204117 | A1 | 10/2004 | Weiner |

(Continued)

FOREIGN PATENT DOCUMENTS

DE    19632354 C1    2/1998

(Continued)

*Primary Examiner* — Pierre-Louis Desir

(57) ABSTRACT

Apparatus (58), and an associated method, for facilitating delivery of network-specific dialing codes to a mobile node (12). When a mobile node (12) is registered to a network part (18) of the network infrastructure of a radio communication system (10), a request (62) is generated by the mobile node (12), requesting download thereto of the dialing codes used in the network part (18) to call service centers (42) associated therewith. The requested dialing codes are downloaded to the mobile node (12). And, the downloaded dialing codes are indexed (68) together with the dialing codes normally used by the mobile node (12) to call the corresponding service centers (42). Subsequently, when a call is placed to a service center, the dialing codes are transposed (74), if necessary, to permit the call to a designated service center (42) to be completed.

20 Claims, 7 Drawing Sheets

U.S. PATENT DOCUMENTS

2005/0118998 A1 6/2005 Sanchez Ferreras et al.
2006/0004643 A1* 1/2006 Stadelmann et al. ........... 705/34

FOREIGN PATENT DOCUMENTS

| EP | 1001590 | A2 | 5/2000 |
| GB | 2330033 | A | 4/1999 |
| GB | 2367218 | A | 3/2002 |
| JP | 2001-045553 | A | 2/2001 |
| WO | 98/23108 | A2 | 5/1998 |
| WO | 00/41421 | A1 | 7/2000 |

* cited by examiner

APPARATUS, AND ASSOCIATED METHOD, FOR TRANSPOSING SHORT CODES USED TO DIRECT A CALL TO A SERVICE CENTER DURING OPERATION OF A MOBILE COMMUNICATION SYSTEM

CROSS REFERENCE TO RELATED APPLICATION

The present application is a continuation of application Ser. No. 10/773,468 filed on Feb. 5, 2004, which application claimed the benefit of International Application No. PCT/CA03/00162, filed on Feb. 6, 2003, the entire disclosure of which is incorporated herein by reference.

The present invention relates generally to a manner by which to facilitate call placement by a user of a mobile node to a service center, such as an emergency dispatch center or a directory-service center, identifiable by a user by a short dialing code, such as a 9-1-1 or 9-9-9 dialing code. More particularly, the present invention relates to apparatus, and an associated method, that associates short dialing codes used in a network with which the mobile node is registered with short dialing codes normally used by the user to identify the service center.

The shortened dialing codes are, sometimes, geographically unique, i.e., the codes differ in different areas. The user of the mobile node need not learn new, short dialing codes when communicating by way of a network in an area that uses different codes. The short dialing codes regularly utilized by the user can continue to be used by the user, irrespective of where the mobile node is positioned, and the network with which the mobile node is registered, when a call is placed to the service center. The short dialing codes are transposed, if needed, at the mobile node to place the call to the service center. Calls intended to be placed to the service center are more likely to be completed as the user of the mobile node need not learn the short dialing codes used by different networks in order to place a call to an appropriate service center.

BACKGROUND OF THE INVENTION

The use of modern communication systems through which to communicate is a necessary aspect of modern society. Communication of data is required to effectuate many varied functions and services. The data that is to be communicated pursuant to such functions and services must sometimes be communicated, quickly and accurately, between widely dispersed locations.

Communication stations are positioned at the locations between which data is to be communicated. And, the communication stations are connected there together by a communication channel. Large numbers of users are able to effectuate many different types of communication services through use of many varied types of communication systems. And, as technological advancements permit, new types of communication systems have been developed and deployed. Some of the new types of communication systems permit existing communication services to be carried out more efficiently and some have made new types of communication services available. Technological advancements continue. And, new types of communication systems in which such technological advancements are deployed shall correspondingly be made available.

Technological advancements have, for instance, permitted the widespread deployment of communication systems that utilize digital communication techniques. Several advantages are provided by the use of digital communication techniques. Improved communication efficiencies are possible as a result of the use of digital communication technique. When digital communication techniques are utilized, data that is to be communicated is digitized into digital form. Communication redundancies can be relatively easily removed from the data once the data is digitized.

By removing such redundancies, redundant data need not be communicated. And, as a result, the communication capacity of a communication system that utilizes digital communication techniques can be substantially increased relative to the communication capacity permitted in a corresponding communication system that utilizes only analog communication techniques.

A radio communication system is an exemplary type of communication system. A radio communication system is referred to as such because the communication channel that interconnects the communication stations in such a system is formed, at least in part, upon a radio link. That is to say, a radio link forms at least a portion of a communication path extending between the communication stations of the radio communication system. And, the data that is communicated between the communications stations is communicated upon the communication channel, referred to as a radio channel, defined upon the radio link.

Use of a radio communication system by which to communicate provides various advantages. For instance, a radio communication system is generally more economically deployed than a wireline counterpart. The costs associated with the installation of the network infrastructure of a radio communication system is generally less than the costs associated with installation of the network infrastructure of a wireline counterpart. So, for reasons associated with initial-installation costs, deployment of a radio communication system is sometimes preferred over deployment of a wireline counterpart. Also, a radio communication system is implementable as a mobile communication system. And, mobility of communications is provided in a mobile communication system. Communications in a mobile communication system are possible, from and between, locations at which communications utilizing a conventional wireline communication system would be impractical. And, communications with a communication station as it is moving are sometimes also possible.

A cellular communication system is a type of radio communication system. Multiple accesses by significant numbers of users are permitted in a cellular communication system, and cellular communication systems have achieved high levels of usage, i.e., penetration, in many areas. The network infrastructures of cellular communication systems have been deployed throughout significant geographical portions of populated areas of the world. Successive generations of cellular communication systems have been developed and deployed using various communication technologies. And, successor-generation systems, intended to supplement and, eventually, to replace existing systems, also utilizing various communication technologies, are undergoing deployment or are under development.

Systems that were first-installed are referred to as being first-generation (1G) cellular communication systems. First-generation systems generally utilize conventional analog communication techniques and use frequency-division, multiple-access communication schemes. First-generation systems generally provide for circuit-switched, voice communications. Second-generation (2G) cellular communication systems, introduced subsequent to first-generation systems, generally utilize digital communication techniques and provide for some data services. 2.5G (second-and-a-half generation) and 3G (third-generation) systems are currently undergoing deployment. These systems, generally, provide for more extensive data services, e.g., such as services at higher data rates as well as services effectuable at multiple data rates. Successor-generation systems are under development. These systems are intended to provide opportunities for yet-further expanded communication services.

The GSM (Global System for Mobile communications) cellular communication system is an exemplary second-generation cellular communication service. An operational specification, promulgated by the ETSI (European Telecommunications Standards Institute), sets forth the operating protocols, and operational standards relating to operation of devices in such a system. The GSM system utilizes a combination of a frequency division multiple access (FDMA) and time-division multiple access (TDMA) communication schemes. Networks constructed to be operable pursuant to the GSM operating specification have been installed throughout many of the developed countries of the world. And, many millions of users subscribe to service in a GSM system to communicate telephonically there through. Other cellular communication systems, operable pursuant to other operating specifications have analogously been constructed.

Users communicate through the use of mobile nodes. The mobile nodes are regularly of physical dimensions permitting their hand-carriage by users of the mobile nodes. And, many mobile nodes are constructed to mimic operation of conventional telephonic stations. That is to say, many mobile nodes are operable both to originate and to terminate telephonic calls in manners that appear to the user to correspond to the manners by which a conventional, telephonic station is utilized to originate and to terminate such calls.

When a call is originated elsewhere for termination at the mobile node, signaling is generated with the mobile node during a call set-up procedure to cause an alert, such as a ringing tone, to be generated at the mobile node. The alert alerts the user of the mobile node of the call placement thereto. And, the user of the mobile node is able to accept the call in a manner analogous to the manner by which the user of a conventional wireline station takes the wireline station off-hook.

When a call is originated at the mobile node, the user enters the dialing digits that identify the station, i.e., the called party, at which the call is intended to be terminated, again in manners analogous to the manners by which the dialing digits associated with the called party are entered at a conventional wireline station. Call signaling procedures, generally transparent to the user, permit effectuation of the call with the called party.

Shortened dialing codes, herein sometimes referred to as short numbers or short dialing codes, are used to identify certain designated service centers in some areas. For instance, in the United States, some areas have 9-1-1, emergency service centers. The 9-1-1 code is sometimes referred to as an emergency number. In areas that have 9-1-1 service centers, when the 9-1-1 code is entered at a telephonic station, a call is routed to an appropriate 9-1-1 service center, thereby to facilitate emergency assistance responsive to the call. In other areas, such as the United Kingdom, an emergency services center is accessed telephonically from a telephonic station through the entry of a 9-9-9 code.

Other service centers are also designated by short numbers. For instance, directory service centers are accessed telephonically in some areas by entry of a 4-1-1 code at a telephonic station. And, in some other areas, a directory service center is accessed telephonically by entry of a 1-9-2 code. Also, operator assistance is accessed telephonically in some areas by entry of the digit '0' and, in some other areas, by entry of the short code 1-0-0.

When the telephonic station at which the short code is entered is a mobile node, the mobile node might sometimes be positioned in an area at which a short code that designates a particular service center-type be of a first set, or sequence, of digits, and the mobile node might sometimes be positioned in an area at which the short code that designates the particular service center-type be of a different set, or sequence, of digits. For instance, the mobile node might initially be positioned in an area at which the short code associated with an emergency services center comprise the 9-1-1 digits and later positioned in an area at which the short code associated with the emergency service center comprise the 9-9-9 sequence of digits.

The home network associated with the mobile node, generally the network with which the user of the mobile node is familiar, therefore, might well use short codes that differ with the short codes that are used by the home network associated with the mobile node, i.e., the short codes with which the user is familiar or those that are stored, such as for speed-dialing purposes, at the mobile node.

If the short code associated with a service center that the user of the mobile node intends to call is entered at a location that utilizes a different short code to access the service center, the intended service center is not accessed.

A manner is needed, therefore, by which better to provide for placement of a call from a mobile node to a service center using a short code. That is to say, a manner is needed by which to take into account the mobility inherent of a mobile node so that a service center that is accessed by entry of a short code by a user of the mobile node remains accessible irrespective of the position of the mobile node when a call is placed to the service center.

It is in light of this background information related to communications in a radio communication system that the significant improvements of the present invention have evolved.

SUMMARY OF THE INVENTION

The present invention, accordingly, advantageously provides apparatus, and an associated method, by which to facilitate call placement by a user of a mobile node to a service center, such as an emergency dispatch center or a directory-service center, identifiable to a user of a mobile node by a short dialing code, such as a 9-1-1 or 9-9-9 short dialing code.

Through operation of an embodiment of the present invention, a manner is provided by which to associate short dialing codes, normally used by the user to identify the service center with alternate short dialing codes, used in a network with which the mobile node is registered.

Short dialing codes sometimes differ in different areas. That is to say, the short dialing codes are sometimes geographically unique. When a mobile node is used to communicate in an area that utilizes different dialing codes, the user of the mobile node need not learn, or otherwise be aware of, the different dialing codes. The short dialing codes regularly utilized by the user can continue to be used by the user, irrespective of the location of the mobile node, i.e., the network with which the mobile node is registered, when a short dialing code is used to place a call to a designated service center.

The short dialing code, entered at the mobile node, is transposed, if needed, at the mobile node, and an alternate, i.e., transposed, dialing code is substituted for the entered code. Calls intended to be placed to a designated service center are more likely to be completed as the user of the mobile node need not learn the short dialing codes used by different networks in order to place a call to an appropriate service center.

In one aspect of the present invention, a request message is generated at the mobile node subsequent to registration of the mobile node with a network through which the mobile node is to communicate. The request message forms a request that requests operator-specific short codes that are associated with the network with which the mobile node is registered. The request message indicates the information that is requested pursuant to the request as well as, selectably, additional information. For instance, the additional information selectably included as part of the request message comprises a language indicator that identifies the language in which information that is to be provided to the mobile node responsive to the request of the request message is to be provided. And, the request message also selectably includes an indication of the network with which the mobile node is registered.

The message is, for example, automatically generated upon completion of conventional registration procedures. And, the response to the message, correspondingly, is returned to the mobile node upon receipt thereof and retrieval of the appropriate information responsive to the information. Or, the message is generated responsive to user instruction. That is to say, the request message is generated upon user initiation. The user selects to request that the short dialing codes, used in the network with which the mobile node is to be operable, are to be downloaded to the mobile node. The selection is made, for instance, through user actuation of a user input actuator, such as the actuation keypad of the mobile node. Responsive to the user selection, the request message is generated and transmitted by the mobile node. Legacy-generation mobile nodes, not constructed to provide for automatic generation of such a request message are adaptable to permit generation of the manually initiated generation of the request message. The request message, caused to be generated upon manual initiation when the communication system in which the mobile node is operation comprises a GSM (Global System for Mobile communications) cellular communication system, is, for instance, a USSD (Unstructured Supplementary Services Data)-formatted message. And, in such a system, the response to the request is also a USSD-formatted message.

In another aspect of the present invention, the mobile node detects a response to the request message. The response includes values representative of the alternate, short dialing codes that are to be used in the network to which the mobile node is registered, or otherwise through which a call to be placed to a service center identified by the short dialing code is to be directed. Additional values, representative, for example, of mnemonics associated with the alternate, short dialing codes are also selectably included in the response that is returned to the mobile node.

In another aspect of the present invention, detected values representative of the alternate, short dialing code together with the values of the mnemonics that are returned to the mobile node are provided to an indexer. The indexer indexes the short dialing codes used at the mobile node to identify one or more service centers together with the alternate short dialing codes returned to the mobile node and detected by the detector. The mnemonics, or any additional information associated with the short dialing code or its associated service center, are also indexed together, as needed. Once indexed together, a mapping between a mobile-node dialing code and its alternate dialing code is readily ascertainable.

When a user of the mobile node enters a short dialing code to place a call to a service center, the values of the digits of the entered dialing code are mapped to the values of the corresponding, alternate dialing code. And, the values of the corresponding, alternate dialing code are substituted for the entered dialing code. Once substituted, otherwise normal calling procedures are carried out to place the call to the service center. Because the entered dialing code is substituted with the alternate dialing code, the call can be completed, i.e., terminated at, the appropriate service center. The call can be completed even though the user of the mobile node does not know the dialing code used in the network in which the call is placed. And, the user of the mobile node need not even be aware that the dialing code that is entered to place a call to a selected service center is not used in the area in which the user initiates a call. When the procedure is automated, the request for the alternate, dialing codes and delivery of the response to the request is carried out in manners wholly transparent to the user of the mobile node. Improved user acceptance of the mobile node is thereby facilitated as the user of the mobile node is better able to complete a call to a service center irrespective of the location at which the user, and the mobile node, is positioned when the call is initiated. And, when the service center forms an emergency service center to which a request for emergency service is requested, substitution of the alternate dialing code for the entered dialing code better assures that an essential call, e.g., a call that requests emergency assistance, is completed and appropriate assistance is rendered.

The mobile node might be positioned in an area in which greater numbers of short dialing codes are available for use than the number of short dialing codes that are available in the home area in which the mobile node is normally operated. That is to say, responsive to a request for download to the mobile node of the alternate dialing codes, more dialing codes than the short dialing codes maintained at the mobile node are downloaded to the mobile node. In addition to the dialing codes that are indexed there together, one or more, additional, alternate dialing codes are available for use at the mobile node. The additional, alternate dialing codes are maintained at the mobile node, and indicia associated therewith are displayable upon a user display, e.g., to identify to the user the availability of use of the additional short dialing codes associated with the one or more additional service centers.

Mnemonic, or other indicia, associated with any of the short dialing codes is also displayable upon the user display to identify to the user of the mobile node the availability of the short codes for use by the user to initiate a call to an appropriate service center. Icons, e.g., or the like, are displayable upon the user display of the mobile node. And, mnemonics, in an appropriate language are also displayable upon the user display. A language preference is selectably also included in the request for the download of the alternate, short dialing codes to the mobile node, and any mnemonics downloaded to the mobile node are downloaded in the language indicated in the requested language preference.

In another aspect of the present invention, the request generated at the mobile node, subsequent to registration of the mobile node with a network, is routed to an application server, or other appropriate functional entity, at which the alternate, short dialing codes are maintained. Additional indicia associated with the alternate, short dialing codes are also maintained at the entity. Mnemonics, in one or more languages, associated with the short dialing codes are, for example, maintained at the entity.

When the request for the download of the alternate dialing codes is delivered to the entity, a retriever detects the request, and responsive thereto, accesses a database at which the alternate short dialing codes, and other associated indicia, are stored. The retriever retrieves the stored information and causes a message containing the retrieved information to be returned to the mobile node.

The application server, or other functional entity, in one implementation, forms a portion of, is coupled to, or is otherwise associated with the network with which the mobile node registers. The application server is coupled, for instance to the MSC/VLR (mobile switching center/visited location register) of a GSM network at which the mobile node is registered. In another implementation, the application forms a portion of, is coupled to, or is otherwise associated with the home network of the mobile node. When the mobile node generates the request message, the message is routed to the home network of the mobile node, and the request is delivered to the application server, or other functional entity, at which the alternate, short dialing codes are stored. In this implementation, the network with which the mobile node is registered is included in the request message, and the database of the application server forms a repository of dialing codes available throughout the system in which the mobile node is potentially operable.

Thereby, a manner is provided by which alternate, short dialing codes are downloaded to a mobile node for use in a network in which the mobile node is registered. When a user of the mobile node enters, or causes entry of, a dialing code associated with a service center, the dialing code is transposed, and substituted with, an appropriate, alternate dialing code. A call placed to a service center associated with the short dialing code is placed even though the user of the mobile node uses a dialing code that otherwise would not result in completion of a call to the service center.

A mechanism is provided by which, when the wireless device first registers in a network, short numbers are downloaded to the mobile node that are specific to the network to which the mobile node is registered. Automatic requests are generated in one implementation. And, in another implementation, the short codes are provided in a format that permits display at the mobile node. Subsequent manual entry of the downloaded short codes, when a call is to be placed, subsequent to user viewing of the display of the short codes is instead performed. A language indicator is also selectably included in a request for the short numbers. The short numbers identify operator type services that are specific to the network with which the mobile node is registered. The short numbers that are downloaded are mapped to equivalent numbers that are permanently stored at the mobile node. The short codes are stored at the mobile node until the mobile node registers subsequently with another network. If the mobile node receives a short code for which a permanent code is not already maintained at the mobile node, the additional short code is stored together with any descriptive text associated therewith.

In these and other aspects, therefore, apparatus, and an associated method, is provided for a radio communication system having a mobile node operable to communicate with a network part of a communication network. The network part is at least operable to route a call, originated at the mobile node, to at least a first service center. Call-placement by a user of the mobile node of a call to the first service center is facilitated. An identifier code request generator is embodied at the mobile node. The identifier code request generator is selectably operable to generate a request for communication to the network part. The request generated by the identifier code generator requests at least a first network-part identifier code that identifies, at the network part, the at least the first service center. An indexer is embodied at the mobile node. The indexer indexes at least a first mobile node identifier code that identifies, at the mobile node, the at least the first service center, together with a corresponding at least first network-part identifier code returned to the mobile node responsive to the request generated by the identifier code request generator.

A more complete appreciation of the present invention and the scope thereof can be obtained from the accompanying drawings that are briefly summarized below, the following detailed description of the presently preferred embodiments of the invention, and the appended claims.

DETAILED DESCRIPTION

Figure 1:
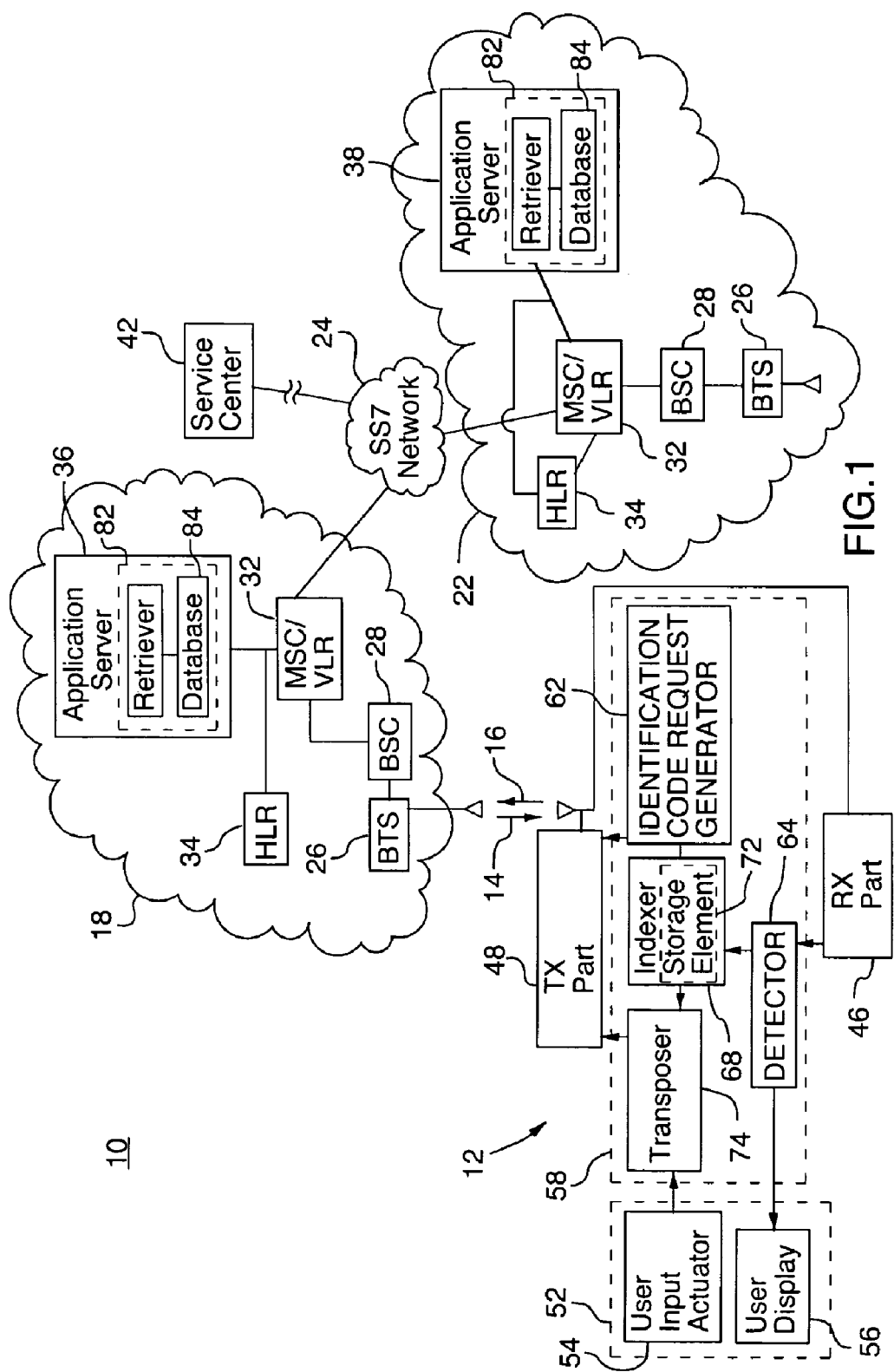
FIG. 1 illustrates a functional block diagram of a communication system in which an embodiment of the present invention is operable.

Referring first to FIG. 1, a communication system, shown generally at 10, operates to provide for radio communications with mobile nodes, of which the mobile node 12 representative. The communication system forms a multi-user communication system in which a plurality of concurrent communication sessions are concurrently effectuable with a plurality of mobile nodes. While only a single mobile node 12 is represented in FIG. 1, in an actual implementation, the communication system typically includes a large number of mobile nodes 12, concurrently operable pursuant to separate communication sessions through which to effectuate various communication services. Additional mobile nodes can be represented in the Figure, analogous to the representations of the mobile node 12.

The communication system 10, in the exemplary implementation, forms a cellular communication system. And, more particularly, the cellular communication system is here operable, generally, pursuant to the operational specification specifying the operational parameters of a GSM (Global System for Mobile communications) cellular communication system promulgated by the ETSI (European Telecommunications Standards Institute). The following description shall describe exemplary operation of an embodiment of the present invention with respect to its implementation in a GSM cellular communication system. An embodiment of the present invention can analogously be implemented in other types of cellular, and other radio, communication systems. Accordingly, it should be understood, that operation of an embodiment of the present invention can also be described with respect to its implementation in any of such other types of communication systems.

The communication system includes a network part. The mobile node communicates with the network part by way of channels defined upon radio links extending between the network part and the mobile nodes. Data communicated to the mobile node is sometimes referred to as being communicated upon a downlink, and data communicated by the mobile node to the network is sometimes referred to as being communicated upon an uplink. Here, the downlink is represented by the arrow 14 and the uplink is represented by the arrow 16. Downlink channels are defined upon the downlink, and uplink channels are defined upon the uplink. Both control data and traffic data are communicated upon various of the channels defined upon the downlink and uplink, respectively.

The network of the communication system illustrates two GSM network parts, a first GSM network part 18 and a second GSM network part 22. The network parts 18 and 22 are connected, in conventional manner, by way of an SS7 signaling network 24. In other implementations, other types of bearer networks, such as an X.25 network, interconnect the GSM network parts.

Each of the network parts includes functional elements of the network infrastructure of a GSM network. The network part 18, for instance, includes radio network elements including a base transceiver station (BTS) 26 and a base station controller (BSC) 28 coupled thereto. The base transceiver station operates to transceive data with the mobile node. And, the base station controller operates to control operation of groups of base transceiver stations. The base station controller, in turn, is coupled to a mobile switching center/visited location register 32. And, the mobile switching center/visited location register is functionally coupled to a home location register (HLR) 34 associated with the network part 18. An application server 36 is also associated with the GSM network part, here functionally coupled to both the MSC/VLR and to the HLR.

The network part 22 includes corresponding elements. That is to say, the second network part also includes commonly-referenced elements of the radio network, namely a base transceiver station (BTS) 26 and a base station controller (BSC) 28. And, the second network part also includes a mobile switching center/visited location register (MSC/VLR) 32 and a home location register (HLR) 34. An application server, here designated at 38, also is embodied at the second network part.

The SS7 network 24 forms a signaling network that provides for communication of signals and data between the separate GSM network parts. While not separately shown, the SS7 network includes, in conventional manner, a switching node forming a service transfer point (STP). Additional networks are connectable to the SS7 network, such as a public-switched, telephonic network (PSTN) or an integrated service digital network (ISDN).

A service center 42 is here shown to be coupled to the SS7 network. The service center is actually coupled to the SS7 network by way of another network, such as one of the aforementioned PSTN or ISDN networks. The service center 42 can, instead, be coupled elsewhere to form part of the communication system 10 by way of another connection. The service center 42 is representative of any calling location identified by a coded sequence of digits. And, here, more particularly, the service center is representative of a calling location identified by a first code by the first network part 18 and identified by a second by the second network part 22.

The service center 42 forms, for instance, an emergency dispatch center. In some areas, the emergency dispatch center is identified by the code 9-1-1 and, in some other areas, is identified by the code 9-9-9. Or, the service center forms, for instance, a directory service center. In some areas, the directory service center is identified by the code 4-1-1 and, in some other areas, the directory service center is identified by the code 1-9-2. Or, the service center forms an operator assistance center that, in some areas, is identified by the dialing code of '0' and, in some other areas by the dialing code of 1-0-0. And, the service center is also representative of any of various other service centers, accessible telephonically through entry of an appropriate dialing code.

The mobile node here includes a receive part 46 and a transmit part 48. The receive and transmit parts operate, in conventional manner, to transceive data pursuant to operation of the communication system. And, the mobile node also includes a user interface 52, including a user input actuator 54 and a user display 56.

During operation of the mobile node, a user might have need to communicate with the service center. During conventional operation of the mobile node, the user enters, or causes entry of, a code associated with the service center. A user initiates a call, for instance, through appropriate actuation of the input actuator 54. The input actuator, e.g., a telephonic keypad, is actuated by the user to input the dialing code associated with the designated service center. Calling procedures are carried out, and a call connection is formed with the service center. This procedure is successfully carried out in conventional manner when the dialing code entered, or caused to be entered, by the user is the code used by the network part of the communication system through which the call is routed to the service center.

As noted previously, however, because the service center is identified by different codes in different areas, such as areas encompassed by different network parts, here the areas encompassed by the network parts 16 and 18, the call might not be completed using conventional calling procedures. The mobile node further includes apparatus 58 of an embodiment of the present invention to facilitate call completion of a call to the service irrespective of the network part through which the call is placed to the service center. The elements of the apparatus are functionally represented. And, the functions provided by such elements can be implemented in any desired manner, such as, for instance, by algorithms executable by appropriate processing circuitry. Also, the functions provided by such elements are, in various implementations, carried out by other structure of the mobile node, such as at the transmit or receive parts, respectively, of the mobile node.

The apparatus includes an identification code request generator 62. The request generator operates to generate a request message to request download to the mobile node of the identification codes, i.e., the short dialing codes, used in the network part to which the mobile node is registered to identify the service centers connectable there through. The request generator, in one implementation, operates automatically subsequent to registration of the mobile node with a network to request the downloading of the identification codes. In another implementation, the request message generated by the request generator operates responsive to manual initiation.

The request message generated by the identification code request generator is applied to the transmit part of the mobile node, and the transmit part causes the request message to be transmitted to the network part of the communication system. In one implementation, the message is formatted to form a USSD-formatted message, and the transmit part of the mobile node causes the USSD-formatted message to be communicated in manners conventional of transmission of other USSD-formatted messages upon an appropriate uplink channel defined upon the uplink 16.

A response to the request is prepared and returned upon an appropriate downlink channel defined upon the downlink 14 to the mobile node. The apparatus also includes a detector 64 coupled to the receive part of the mobile node. The detector operates to detect the response to the message request that is returned to the mobile node. Detections made by the detector are provided to an indexer 68. The indexer 68 also forms part of the apparatus 58 of an embodiment of the present invention. The indexer includes, or is coupled to, a storage element 72.

The indexer 68 operates to index values of the identification codes downloaded to the mobile node and detected by the detector 64 together with permanently stored values of the identification codes that are associated by the mobile node, or the user thereof, with the service centers. By indexing the permanently stored values with the downloaded values, an association is formed between the separate values, permitting matching of the values, and use of the appropriate values, when a call is subsequently to be effectuated to a designated service center.

Once the values are indexed together, the values are stored at the storage element 72, available for subsequent retrieval when a call is to be placed at the mobile node to a designated service center. The values remain stored thereat, in the exemplary implementation, until the subsequent download of updated identification codes are provided to the mobile node. A subsequent download occurs, for instance, when the mobile node is subsequently repositioned to necessitate another registration procedure to be performed. In an implementation in which the request message generated by the mobile node is automatically generated when a registration procedure is performed, a new download of values of identification codes, together with additional appropriate indicia, is provided to the mobile node each time in which a registration procedure is performed, to include, additionally, initial powering-on of the mobile node as well as at timed intervals subsequent thereto.

The apparatus also includes a transposer 74 coupled to both the indexer and to the user input actuator 54 of the user interface 52. Thereby, when a call by a user of the mobile node to a service center is initiated, the transposer is made aware of the call placement. That is to say, when the user enters the shortened dialing code of a service center, the values of the shortened dialing code are provided to the transposer. Other input indicia entered by a user and associated with a call attempt to a service center is analogously provided to the transposer. And, responsive to the call initiation, the transposer operates to transpose the values input by way of the user actuator, or otherwise caused to be provided thereto pursuant to initiation of a call to the service center, together with corresponding downloaded values that identify the service center. When the values entered by the user to initiate the call to the service center differ with the values used in the network in which the mobile node is operable, the transposer substitutes the downloaded values, indexed by the indexer and stored at the storage element for the entered values. And, the transposer provides the substituted values to the transmit part 48. Normal call procedures are thereafter utilized to place the call to the service center. A call that otherwise would not successfully be placed to the designated service center is, through operation of the apparatus 58, able to be completed. And, in at least one implementation, the functions carried out by the apparatus to cause the call to be placed using the dialing code used in the network in which the mobile node is registered, are performed automatically. A user need only initiate the call to the service center in the manner in which the user is accustomed. Operation of the apparatus 58 causes the appropriate, short dialing code to be substituted for the entered dialing code. And, the call is placed in normal manner thereafter.

Further apparatus of an embodiment of the present invention is also embodied at the network of the communication system. And, more particularly, in the exemplary implementation, further apparatus of an embodiment of the present invention is embodied at the application server 36 of the network part 18. The apparatus embodied at the application server 36 is here shown to include a retriever 82 and a database 84. And, analogously, further apparatus of an embodiment of the present invention is also embodied at the application server 38 of the network part 22.

When the request message generated by the request generator 62 is sent by the transmit part of the mobile node upon the uplink channel, the request message is delivered to the radio network elements of the network part, the message is routed through the network part and delivered to the application server. The database 84 maintains a listing of the short dialing codes used at the network part to identify service centers, such as the service center 42. Responsive to the request, the retriever 82 accesses appropriate storage locations of the database to retrieve the values of the dialing codes. And, the retrieved values are returned to the mobile node. In one implementation, when a USSD-formatted request is used by which to form the request message, the response is also a USSD-formatted message.

In a further, or alternate, embodiment of the present invention, the request message generated by the request generator and sent to the network portion of the communication system is routed to the home network associated with the mobile node. Here, for instance, the second network part 22 is representative of the home network associated with the mobile node 12. The request message, delivered to the first network part 18, is routed there through, and then by way of the SS7 network 24 for delivery to the network part 22. The request message is then routed through the network part for delivery to the application server 38. Once delivered to the application server, the retriever of the apparatus embodied thereat retrieves the requested values from the database, and a response to the request is routed back to the first network part, by way of the SS7 network, for subsequent delivery to the mobile node. And, once delivered to the mobile node, the elements of the apparatus 58 embodied thereat, operate as described above. When a call is subsequently placed to a service center identified by an identification code, the identification code appropriate for the network part, here the network part 18 with which the mobile node is registered, is used to place the call to the service center.

Figure 2:
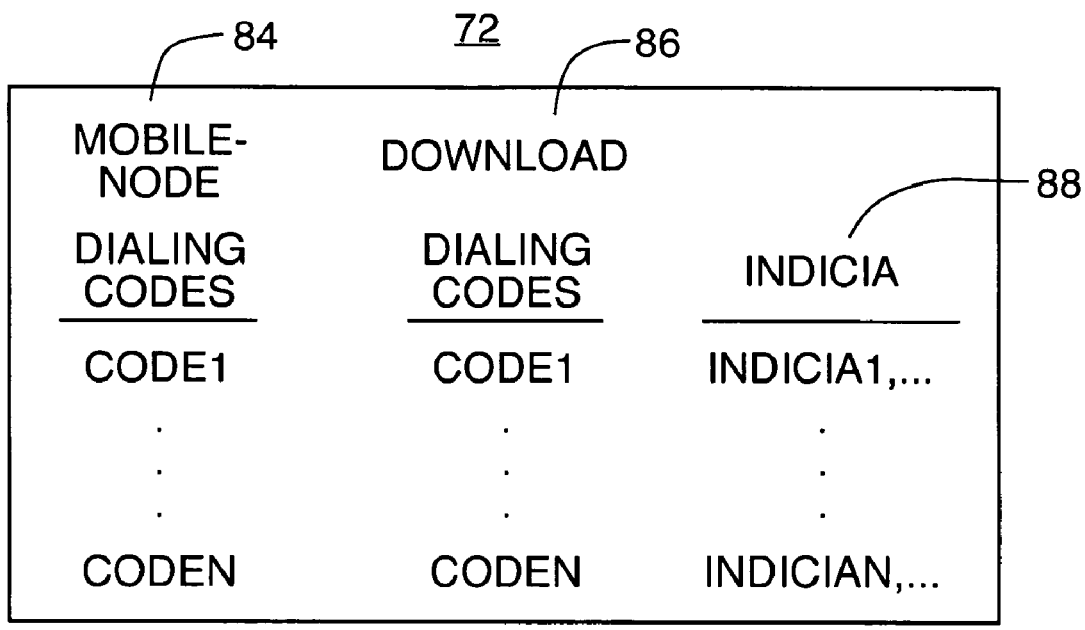
FIG. 2 illustrates a functional representation of values of indexed information stored at the mobile node pursuant to an embodiment of the present invention.

FIG. 2 illustrates a representation of the data stored at the storage element 72 pursuant to operation of an embodiment of the present invention. Data stored in the column 84 is representative of mobile-node dialing codes associated with service centers, and the data stored in the column 86 is representative of downloaded dialing codes that are associated with the corresponding service centers. And, data stored in the column 88 is representative of other indicia, such as mnemonics associated with the corresponding dialing codes.

A network part to which the mobile node is registered might have greater, or fewer, service centers identified by shortened dialing codes.

Figure 3:
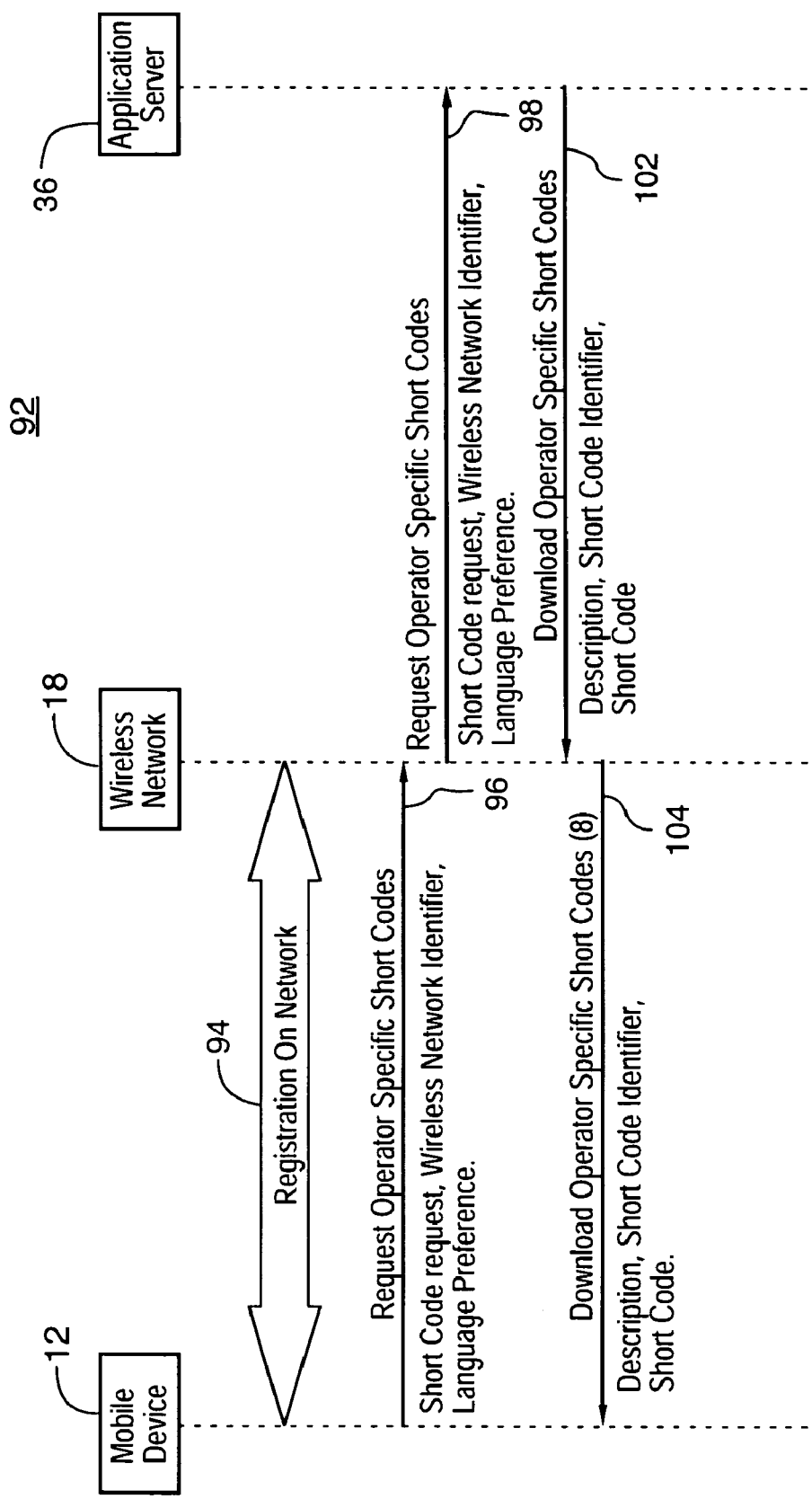
FIG. 3 illustrates a message sequence diagram representative of exemplary signaling generated during operation of the communication system shown in FIG. 1 pursuant to an embodiment of the present invention.

FIG. 3 illustrates a message sequence diagram, shown generally at 92, representative of signaling generated during exemplary operation of a communication system, such as the communication system 10, pursuant to operation of an embodiment of the present invention.

Initially, and as indicated by the arrow 94, the mobile node 12 becomes registered with the network portion of the communication system. Conventional control, and other, signals are generated by, and between, the mobile node and the network portion to effectuate the registration in conventional manner. Subsequent to registration of the mobile node, a request, indicated by the segment 96, is generated at the mobile node and sent to the network. As indicated, in the exemplary implementation, the request generated by the mobile node includes a request for the short dialing codes used in the network with which the mobile node is registered. That is to say, the request includes an indication of the information that is requested to be downloaded to the mobile node. The request here further includes a language identifier representative of the language in which the requested information is to be supplied. And, additionally, in the exemplary implementation, the request message also identifies the network part to which the mobile node is registered.

The request message is delivered to the network portion of the communication system. And, then, the request message is routed, as indicated by the segment 98, through the network for delivery to the application server, here the application server 36. Alternately, and as described above, the request message is routed to the home network associated with the mobile node and to the application server 38 thereof. The request message, when delivered to the application server, includes the same information that is included in the message when the message is delivered to the network portion.

When the request is delivered to the application server, the application server examines the contents of the request. If the request is a request for downloading of operator-specific short codes, the application server further examines the request message for the identification of the wireless network part at which the mobile node is registered. A determination is made as to whether the information that is requested is available at the application server. In one implementation, if the request message fails to include the identity of the network part to which the mobile node is registered, an assumption is made that the requested information is for the network part with which the application server is associated. Examination is further made to determine whether the requested information is available in the requested language. If the information is available in the request language, the information is provided in that language. Otherwise, a default language selection is instead used.

Once the requested information is retrieved at the application server, the response is routed back to the mobile node by paths indicated by the segments 102 and 104. The response includes a human-readable description, a tag that identifies to the mobile node the purpose of the short codes contained in the response, and also the short codes. And, when the response is delivered to the mobile node, the information is stored at the mobile node. In an implementation in which the information can not be stored at the mobile node, the information is displayed, in human perceptible form, to permit a user of the mobile node later to use the information contained in the response.

Figure 4:
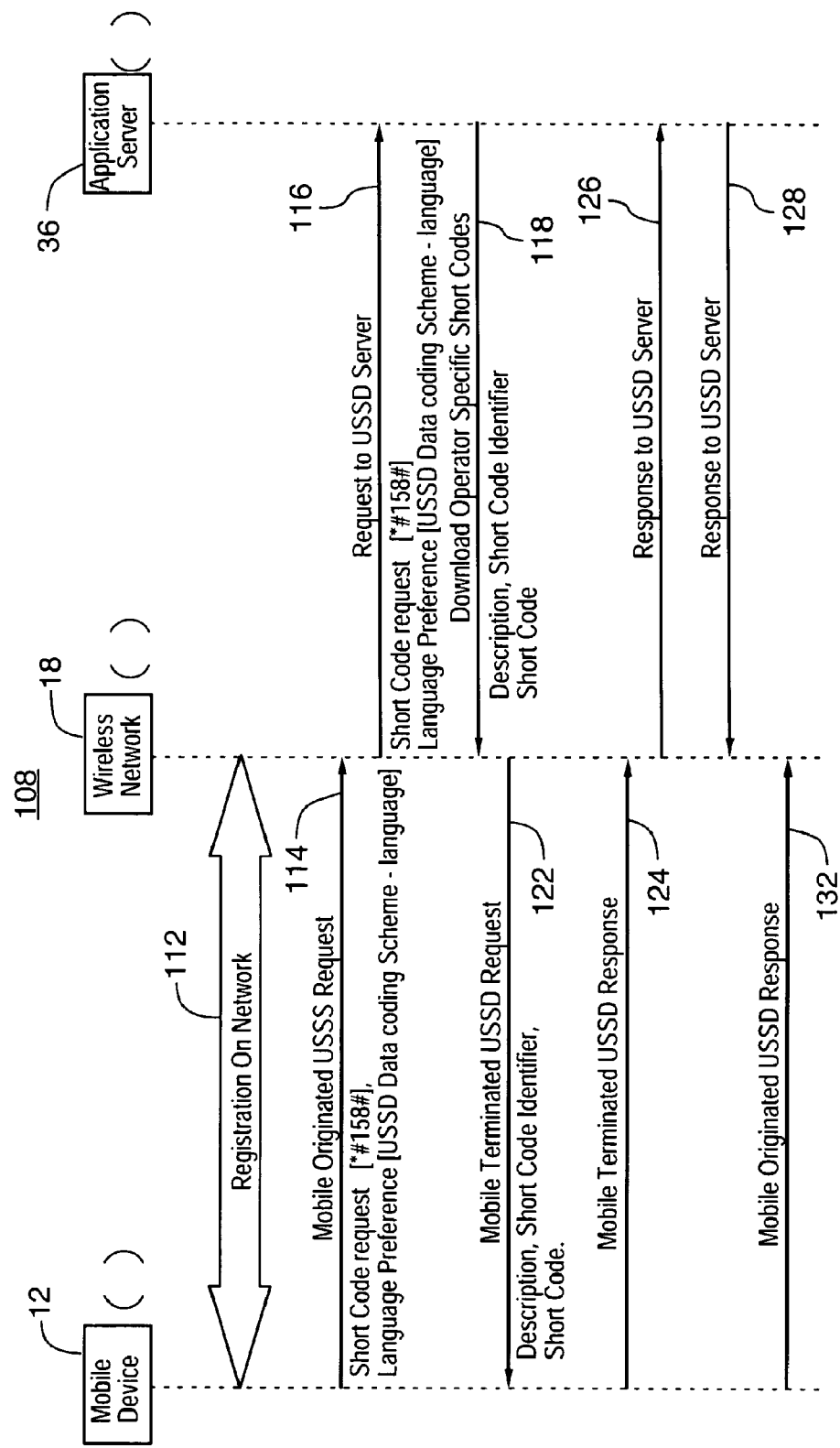
FIG. 4 illustrates a message sequence diagram, similar to that shown in FIG. 2, but representative of exemplary signaling generated during operation of the communication system shown in FIG. 1 pursuant to another embodiment of the present invention.

FIG. 4 illustrates a message sequence diagram, shown generally at 108, representative of signaling generated during exemplary operation of a communication system, such as the communication system 10, also pursuant to operation of an embodiment of the present invention. Here the signaling is representative of operation in which USSD-formatted messages are used to initiate downloading of, and to download, identification codes to the mobile node.

Again, the mobile node registers with a network part of the network portion of the communication system. The registration procedures are represented by the arrow 112. Conventional, control signaling is generated between the network and the mobile to effectuate the registration of the mobile node with a network part of the network of the communication system.

Then, and as indicated by the segment 114, the mobile node generates and sends a request message to the network to request the downloading thereto of the short codes that are used in the network part of the network at which the mobile node is registered. The request message is formatted as a USSD-formatted request. The request includes an identifier that indicates the information that is to be downloaded to the mobile node and a language indicator that indicates the language in which the mnemonic portion of the information is desired. And, an indication is also included in the message to indicate that the response to the request message should be sent in text form, such as formatted as a USSD-formatted response message.

Once delivered to the network part, the request message is routed, in manners conventional of a USSD message, and as indicated by the segment 116, to an appropriate application server, here the application server 36. When the request message is delivered to the application server, the contents of the message are examined. If the request is a request for downloading to the mobile node of operator-specific short codes, the application server then examines the identification of the wireless network part for which the information is requested. If the request message does not include the identification of the network part, the application server assumes, for instance, that the requested information pertains to the network part with which the application server is associated. The application server further examines the request message to ascertain the language in which the information is requested and determines whether the information is available in the requested language. If the information is not available in the requested language, a default language is instead used.

The requested information is retrieved, and a response message is generated and returned, as indicated by the segments 118 and 122, to the mobile node. The response here includes the dialing codes associated with the service centers, a human-readable description, and a tag that identifies to the mobile node the purpose of the downloaded codes. The response message communicated by the network part to the mobile node forms a USSD-formatted message, and the response message forms a mobile-terminated, USSD message.

The message is delivered to the mobile node. And, responsive thereto, the mobile node displays the received codes together with their associated text. And, the mobile node positively acknowledges, indicated by the segment 124, the receipt of the downloaded information. The acknowledgment here forms a mobile-terminated USSD response. And, when the response is delivered to the network part, a positive acknowledgment, in turn, is provided, indicated by the segment 126, to the application server.

Thereafter, and as indicated by the segment 128, the application server acknowledges the original request from the mobile node, thereby to complete and close the transaction by sending a response to the network part to, in turn, send the acknowledgment to the mobile node. And, as indicated by the segment 132, the network part sends a mobile-originated USSD-formatted response to the mobile node. Upon receipt of the mobile-originated USSD response at the mobile node, the mobile node is made aware that the original request has been successfully completed.

Figure 5:
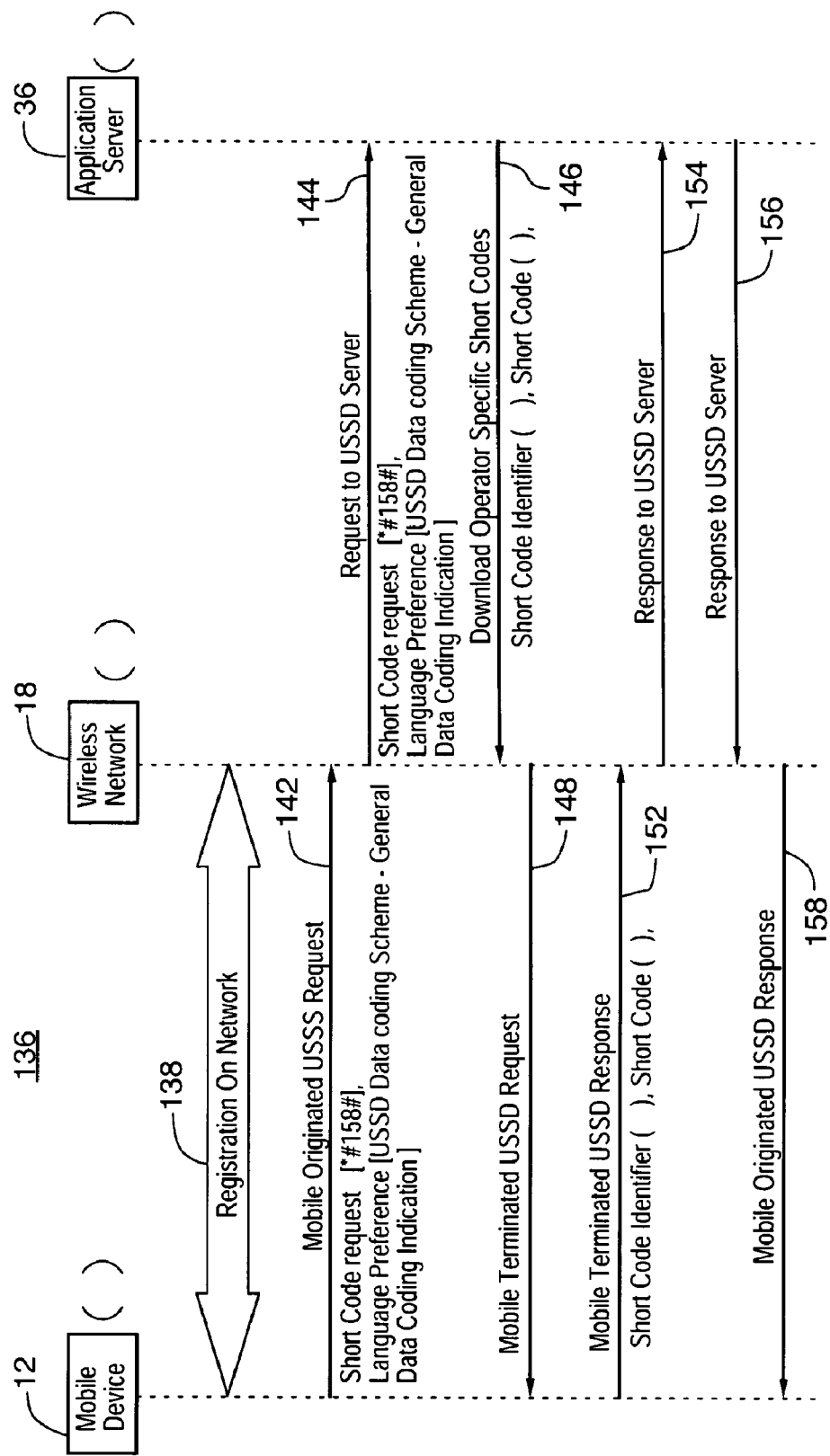
FIG. 5 illustrates another message sequence diagram, similar to those shown in FIGS. 2 and 3, but representative of exemplary signaling generated during operation of the communication system shown in FIG. 1 pursuant to another embodiment of the present invention.

FIG. 5 illustrates a message sequence diagram, shown generally at 136, representative of signaling generated during additional exemplary operation of a communication system, such as the communication system 10, also pursuant to operation of an embodiment of the present invention. The signaling is illustrated here is also representative of operation in which USSD-formatted messages are used to initiate downloading of, and to download, identification codes to the mobile node.

Again, the mobile node first registers with a network part of the network of the communication system. The registration of the mobile node with the network is indicated by the arrow 138. Again, control signaling between the mobile node and the network is performed to register the mobile node with the network part.

Once registration is effectuated, the mobile node generates, and sends, as indicated by the segment 142, a request for download thereto of operator-specific short dialing codes from the wireless network. The request forms a mobile-originated USSD request. The request includes an identifier that indicates what is being requested to be downloaded to the mobile node, and a language identifier indicating the language in which the mnemonic portion of the requested information is desired. The language identifier here indicates general data code, and the receipt of the language indicator indicates that the response is to be sent in binary encoded form to the mobile node.

Once delivered to the network part, the information request is forwarded on, as indicated by the segment 144, to an appropriate application server, here again the application server 36. When the request is received at the application server, the request is examined. If the request is for operator-specific short codes, the application server examines the identification of the wireless network, if included in the request. If a wireless network part identifier is not included in the request, an assumption is made that the requested information is for the short codes of the network part with which the application server is associated. As, here, the language indicator is set to general data coding, the application server constructs the short codes that are to be downloaded to the mobile node in a binary format.

The application server then sends, as indicated by the segment 146, the short codes to the wireless network together with a tag that identifies, to the mobile node, the purpose of the short codes. And, upon receipt thereof, the network part, in turn, sends, as indicated by the segment 148, the information to the mobile node in the form of a mobile-terminated USSD request. Upon receipt of the mobile-terminated USSD request, the mobile node stores the received short code identifiers and the associated short codes.

The mobile node then, and as indicated by the segment 152, positively acknowledges receipt of the short codes with a mobile-terminated USSD response that is sent to the network part. And, as indicated by the segment 154, the acknowledgment is forwarded on the application server. The application server, in turn, then acknowledges, as indicated by the segment 156, the original request sent by the mobile node, thereby to complete and close the transaction by way of delivery of the response to the wireless network part. And, upon receipt of the acknowledgment at the wireless network part, a mobile-originated USSD response is sent, indicated by the segment 156, to the mobile node. Upon receipt of the mobile-originated USSD response, the mobile node is made aware that the request has been successfully completed.

Figure 6:
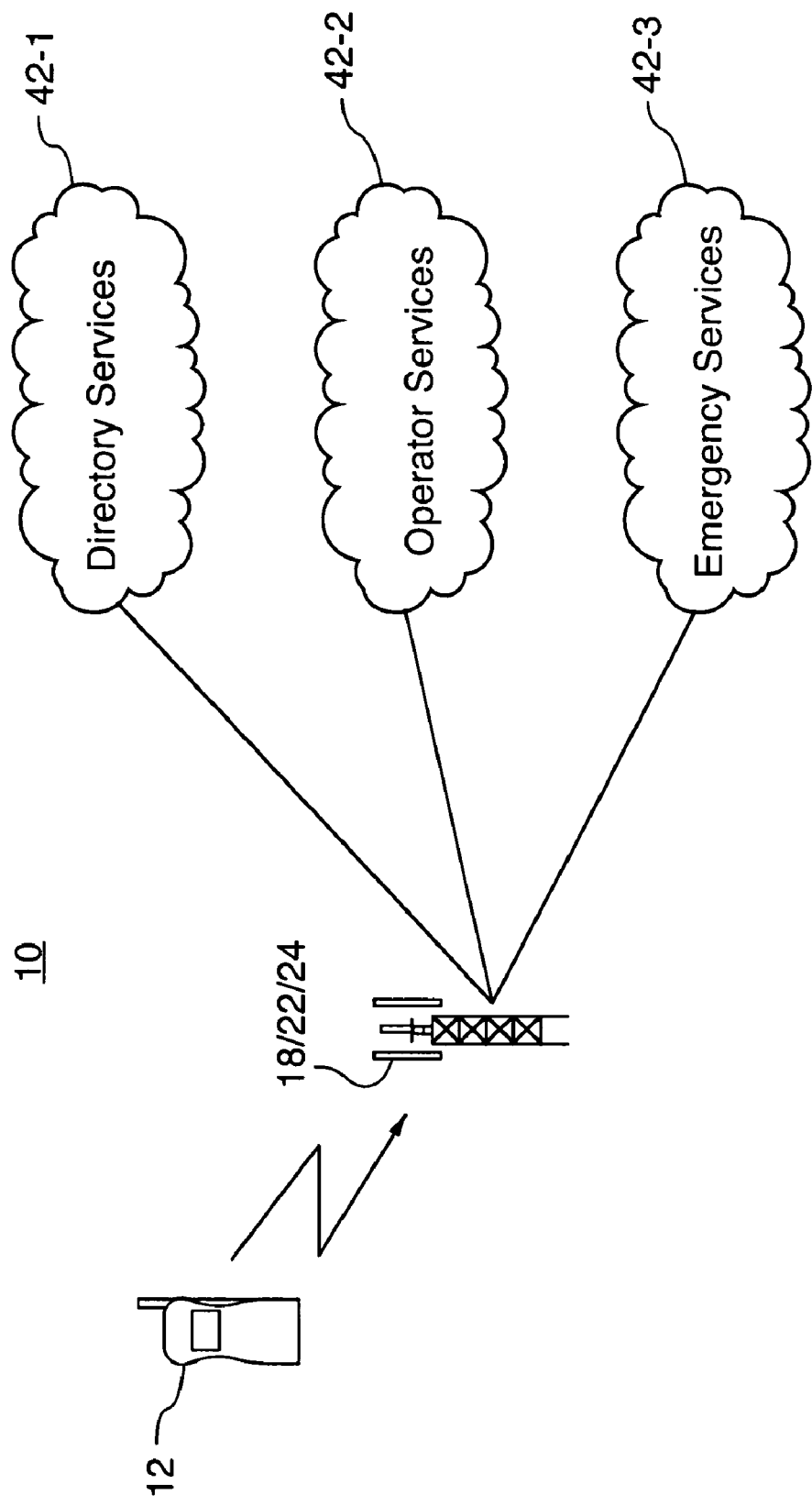
FIG. 6 illustrates a functional representation of the communication system shown in FIG. 1 in which a mobile node initiates a call to a designated service center pursuant to operation of an embodiment of the present invention.

FIG. 6 again illustrates the communication system 10. The communication system 10 again is shown to include the mobile node that is capable of communicating, by way of channels defined upon the downlink and uplink 14 and 16, respectively, with the network parts 18, 22, and 24 of the network portion of the communication system. Here, three service centers 42 are coupled to the network parts. A first service center 42-1 is a directory services center. A second service center 42-2 is an operator services center. And, a third service center 42-3 is an emergency services center. When a call is to be placed to any of the service centers 42, a user of the mobile node enters, or causes entry of, the dialing code believed to correspond to the service center to which the call is to be placed. Operation of an embodiment of the present permits the dialing code to be transposed, if necessary, to permit the call to the service center to be effectuated. And, in another embodiment, the dialing code used to identify the service center is otherwise alerted to the user of the mobile node, thereby to alert the user to enter the dialing code associated with the service center in the network part to which the mobile node is attached.

Figure 7:
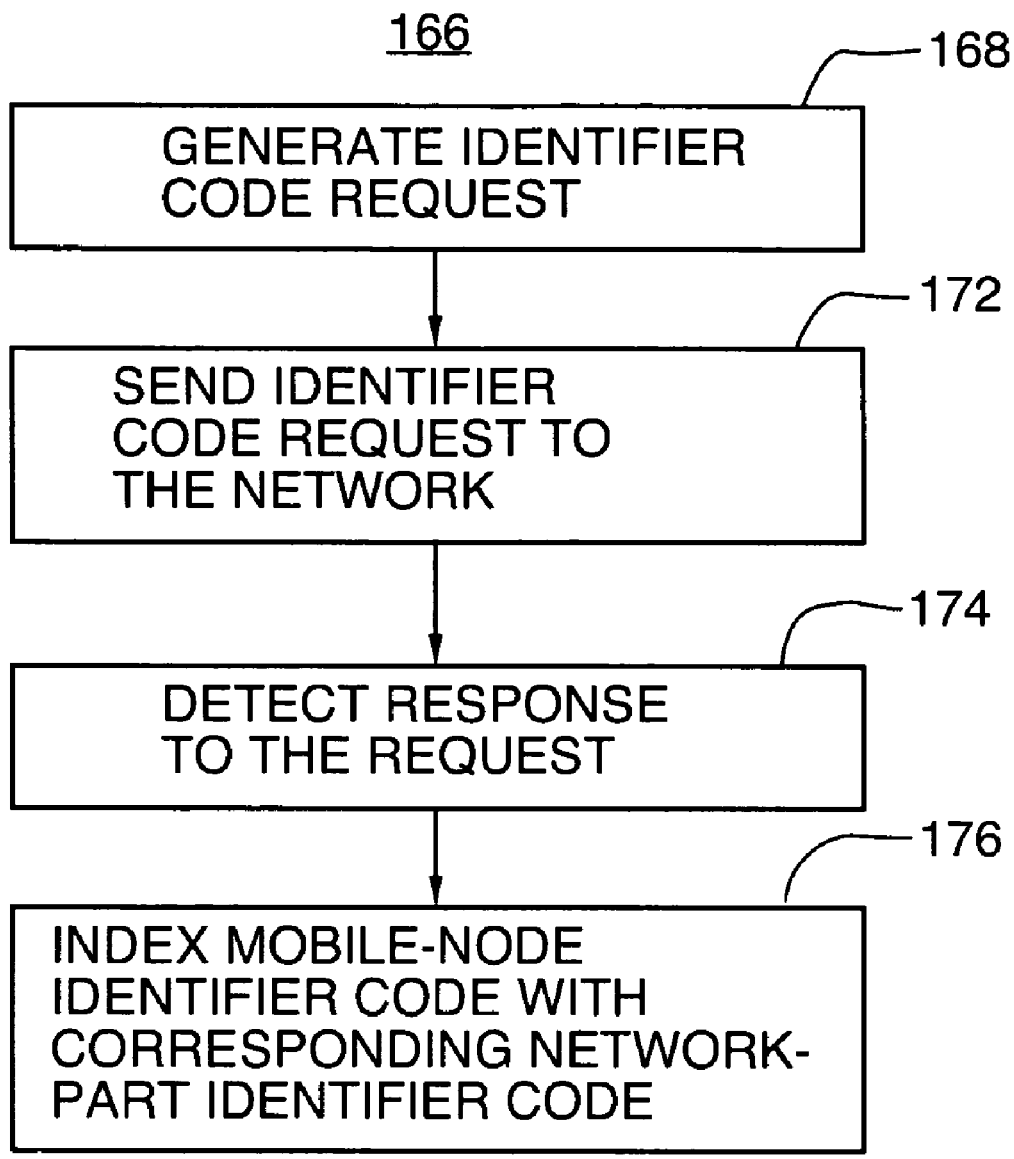
FIG. 7 illustrates a method flow diagram representative of the method of operation of an embodiment of the present invention.

FIG. 7 illustrates a method flow diagram, shown generally at 166, representative of the method of operation of an embodiment of the present invention. The method facilitates call-placement by a user of a mobile node of a call to a service center.

First, and as indicated by the block 168, an identifier code request is generated at the mobile node. The request requests a first network-part identifier code that identifies, at the network part, the first service center. Then, and as indicated by the block 172, the identifier code request is sent to the communication network.

Thereafter, and as indicated by the block 174, a response is detected, at the mobile node, to the request. The response contains values representative of the first network-part identifier. And, then, as indicated by the block 176, the first mobile-node identifier code is indexed together with a corresponding network-part identifier code.

When a call is subsequently placed by the mobile node to a service center, the network-part identifier code is used, thereby to permit the call to be completed to the designated service center.

The previous descriptions are of preferred examples for implementing the invention, and the scope of the invention should not necessarily be limited by this description. The scope of the present invention is defined by the following claims.

The invention claimed is:

1. A method of communicating in a radio communication system having a mobile node operable to communicate with a network part of a communication network, the network part operable to route a call, originated at the mobile node, to a first service center, for a predetermined geographic area, by the mobile node transmitting to the network part, an identifier code for the first service center, said method comprising:

generating an identifier code request at the mobile node, the identifier code request for requesting, at least one of: a first network-part identifier code that identifies, to a network part, a first service center for a predetermined geographic area wherein the mobile node is located, and other information associated with said first network-part identifier code;

sending the identifier code request to a network part of the communication system;

detecting, at the mobile node, a response to the request, the response containing at least one of the first network-part identifier code comprising a short dialing code, which identifies a first service center for the predetermined geographic area wherein said mobile node is located, and information representative of the first service center; and transposing values of the first network-part identifier code for a first mobile node identifier code for the first service center, responsive to initiation of call placement of the call to the first service center by the mobile node user.

2. The method of claim 1, wherein said identifier code request, requests both the second a first network-part identifier code and, said other information associated with the second said first network-part identifier code.

3. The method of claim 1, further comprising the step of: placing a call from the mobile node to the service center for the predetermined geographic area wherein said mobile node is located, using said short dialing code.

4. The apparatus of claim 1 further comprising the step of sending a language identifier representative of the language in which requested information is to be supplied to the mobile node.

5. The method of claim 1, further comprising the step of registering with a network part before the step of generating an identifier code request at the mobile node and wherein the step of sending an identifier code request occurs after the mobile node has registered with a network part.

6. The method of claim 1, wherein the step of sending the identifier code request to a network part of the communication system includes the step of sending the identifier code request as an unstructured supplementary services data (USSD)-formatted message.

7. The method of claim 1, wherein the information representative of the first service center or the short dialing code is comprised of a mnemonic.

8. Apparatus for a radio communication system having a mobile node operable to communicate with a network part of a communication network, the network part operable to route a call, originated at the mobile node, to a first service center, the first service center capable of being called from telephone stations and mobile nodes that are within a predetermined geographic area, by the use of an a first mobile-node identifier code, the apparatus comprising:

a processor comprising:

an identifier code request generator embodied at the mobile node, said identifier code request generator operable to generate a request message for at least one of: a first network-part identifier code that identifies, to a network part, a first service center for a predetermined geographic area wherein the mobile node is located, and, other information associated with said first network-part identifier code; and a transposer, operable responsive to initiation of call placement of the call to the first service center by the mobile node user, that substitutes values of the first network-part identifier code for a first mobile node identifier code for the first service center.

9. The apparatus of claim 8 wherein said an identifier code request generator requests both: a first network-part identifier code that identifies a first service center for a predetermined geographic area wherein the mobile node is located and, said other information associated with said first network-part identifier code.

10. The apparatus of claim 8, wherein said other information is a mnemonic associated with the first network-part identifier code.

11. The apparatus of claim 8, wherein said request is an unstructured supplementary services data (USSD)-format message.

12. Apparatus for a radio communication system having a mobile node operable to communicate with a network part of a communication network, the network part operable to route a call, originated at the mobile node, to a first service center, the first service center capable of being called from telephone stations and mobile nodes that are within a predetermined geographic area by the use of a short dialing code, the apparatus comprising:

a base transceiver station; and an application server at the network part that is comprised of:

storage locations, wherein short dialing code information is stored, said short dialing code information including at least one of: a short dialing code used by said network part to identify service centers within said geographic area, are stored, and, additional information; and a retriever, operatively coupled to said storage locations, said retriever accessing a storage location and retrieving therefrom in response to a mobile node request, at least one of: a short dialing code value that identifies a first service center to the network part, and additional information related to said first service center, such that the mobile node, in response to initiation of call placement of a call to the first service center by the mobile node user, transposes values of the retrieved short dialing code for a mobile node short dialing code for the first service center.

13. The apparatus of claim 12, wherein said additional information is comprised of a language indicator that identifies a language in which information is to be sent by said application server.

14. The apparatus of claim 12 wherein said retriever accesses a storage location in response to an identifier code request message received at said application server.

15. The apparatus of claim 12, wherein said application server is configured to send a short dialing code retrieved by said retriever to a mobile node.

16. The apparatus of claim 15, wherein said application server is configured to send at least a mnemonic associated with a short dialing code.

17. In a communication system having a network part and a mobile node operable to communicate with the network part, the network part operable to route a call originated at the mobile node to a first service center, the first service center capable of being called from telephone stations and mobile nodes that are within a predetermined geographic area by the use of a short dialing code, a method of sending short dialing code information to a mobile node comprising the steps of:

storing in an application server coupled to said network part, short dialing code information that includes at least one of: a short dialing code used by said network part to identify a service center within said geographic area wherein said mobile node is located, and, additional information associated with said service center;

retrieving from said application server in response to an identification code request message received by said application server, at least some of said short dialing code information; and transposing, responsive to initiation of call placement of the call to the first service center by the mobile node user, values of said retrieved at least some of said short dialing code information for a dialing code for the first service center dialed at the mobile node.

18. The method of claim 17 wherein said retrieving step includes retrieving a short dialing code and a mnemonic for a service center identified by said short dialing code.

19. The method claim 17 further including the step of sending to a mobile node, the retrieved short dialing code information.

20. The method of claim 17, further including the step of receiving said identification code request message as an unstructured supplementary services data (USSD)-format message.

* * * * *